US008466873B2

(12) United States Patent
Vertegaal et al.

(10) Patent No.: US 8,466,873 B2
(45) Date of Patent: Jun. 18, 2013

(54) INTERACTION TECHNIQUES FOR FLEXIBLE DISPLAYS

(76) Inventors: Roel Vertegaal, Battersea (CA); David Holman, Kingston (CA)

(*) Notice: Subject to any disclaimer, the term of this patent is extended or adjusted under 35 U.S.C. 154(b) by 0 days.

(21) Appl. No.: 13/228,681

(22) Filed: Sep. 9, 2011

(65) Prior Publication Data

US 2012/0112994 A1 May 10, 2012

Related U.S. Application Data

(63) Continuation of application No. 11/731,447, filed on Mar. 30, 2007, now abandoned.

(60) Provisional application No. 60/788,405, filed on Mar. 30, 2006.

(51) Int. Cl.
*G09G 5/00* (2006.01)

(52) U.S. Cl.
USPC .......................................... 345/156

(58) Field of Classification Search
USPC ..... 345/156–184; 178/18.01–19.01; 382/203, 382/285; 463/30, 37
See application file for complete search history.

(56) References Cited

U.S. PATENT DOCUMENTS

| | | | |
|---|---|---|---|
| 5,996,082 A | 11/1999 | Cortopassi | |
| 6,128,003 A | 10/2000 | Smith et al. | |
| 6,160,540 A * | 12/2000 | Fishkin et al. | 345/184 |
| 6,243,074 B1 | 6/2001 | Fishkin et al. | |
| 6,243,075 B1 | 6/2001 | Fishkin et al. | |
| 6,268,857 B1 * | 7/2001 | Fishkin et al. | 715/863 |
| 6,275,219 B1 | 8/2001 | Isenman | |
| 6,297,805 B1 * | 10/2001 | Adler et al. | 345/158 |
| 6,297,838 B1 * | 10/2001 | Chang et al. | 715/863 |
| 6,340,957 B1 * | 1/2002 | Adler et al. | 345/1.3 |
| 6,630,922 B2 | 10/2003 | Fishkin et al. | |
| 6,757,002 B1 | 6/2004 | Oross et al. | |
| 6,937,210 B1 | 8/2005 | MacDonald | |
| 7,401,300 B2 | 7/2008 | Nurmi | |
| 7,443,380 B2 * | 10/2008 | Nozawa | 345/156 |
| 7,456,823 B2 | 11/2008 | Poupyrev et al. | |
| 7,614,008 B2 | 11/2009 | Ording | |
| 7,719,523 B2 | 5/2010 | Hillis | |
| 7,724,242 B2 | 5/2010 | Hillis et al. | |
| 7,728,821 B2 | 6/2010 | Hillis et al. | |

(Continued)

FOREIGN PATENT DOCUMENTS

WO WO 2006/043255 A2 4/2006

OTHER PUBLICATIONS

Balakrishman, R., et al., "Exploring Interactive Curve and Surface Manipulation using a Bend and Twist Sensitive Input Strip," 1999 Symposium on Interactive 3D Graphics Atlanta GA (1999).p. 111-118 and 228.

(Continued)

*Primary Examiner* — Rodney Amadiz
(74) *Attorney, Agent, or Firm* — Stephen J. Scribner

(57) ABSTRACT

The invention relates to a set of interaction techniques for obtaining input to a computer system based on methods and apparatus for detecting properties of the shape, location and orientation of flexible display surfaces, as determined through manual or gestural interactions of a user with said display surfaces. Such input may be used to alter graphical content and functionality displayed on said surfaces or some other display or computing system.

12 Claims, 13 Drawing Sheets

U.S. PATENT DOCUMENTS

| | | | |
|---|---|---|---|
| 7,770,136 | B2 | 8/2010 | Beeck et al. |
| 7,907,124 | B2 | 3/2011 | Hillis et al. |
| 7,918,808 | B2 | 4/2011 | Simmons |
| 8,046,721 | B2 | 10/2011 | Chaudhri et al. |
| 8,059,101 | B2 | 11/2011 | Westerman et al. |
| 2001/0030644 | A1 | 10/2001 | Allport |
| 2002/0004749 | A1 | 1/2002 | Froseth et al. |
| 2003/0040945 | A1 | 2/2003 | Fujita et al. |
| 2003/0063072 | A1 | 4/2003 | Brandenberg et al. |
| 2003/0071806 | A1 | 4/2003 | Annand |
| 2003/0095096 | A1 | 5/2003 | Robbin et al. |
| 2004/0008191 | A1* | 1/2004 | Poupyrev et al. ............. 345/184 |
| 2004/0119716 | A1 | 6/2004 | Park et al. |
| 2004/0202583 | A1 | 10/2004 | Hower et al. |
| 2004/0212588 | A1* | 10/2004 | Moriyama .................... 345/156 |
| 2005/0075923 | A1 | 4/2005 | Kolsky et al. |
| 2005/0140569 | A1 | 6/2005 | Sundahl |
| 2005/0146507 | A1 | 7/2005 | Viredaz |
| 2005/0216867 | A1 | 9/2005 | Marvit et al. |
| 2006/0007135 | A1 | 1/2006 | Imagawa et al. |
| 2006/0036395 | A1 | 2/2006 | Shaya et al. |
| 2006/0066588 | A1 | 3/2006 | Lyon et al. |
| 2006/0087831 | A1 | 4/2006 | Kramer |
| 2006/0197750 | A1 | 9/2006 | Kerr et al. |
| 2006/0261233 | A1 | 11/2006 | Williams et al. |
| 2006/0267966 | A1 | 11/2006 | Grossman et al. |
| 2007/0046643 | A1 | 3/2007 | Hillis et al. |
| 2007/0091178 | A1 | 4/2007 | Cotter et al. |
| 2010/0045705 | A1 | 2/2010 | Vertegaal et al. |

OTHER PUBLICATIONS

Fishkin, K. et at., "Embodied User Interfaces for Really Direct Manipulation," Communications of the ACM, vol. 43, No. 9: 75-80, Sep. 2000.

Guimbretiere, F., "Paper Augmented Digital Documents," ACM Letters Chi, vol. 5. Issue 2: 51-60 (2003).

Holman, D. et al., "PaperWindows: Interaction Techniques for Digital Paper" CHI papers Physical Interaction, Portland, Oregon,: 591-599, Apr. (2005).

Ishii, H. et al., "Tangible Bits: Towards Seamless interfaces between People, Bits and Atoms," CHI, vol. 22-27: 234-241, Mar. 1997.

Johnson, W. et al., "Bridging the Paper and Electronic Worlds: The Paper User Interface," InterChi 93, vol. 3.: 507-512Apr. 1993.

Ju, W, et al., "Origami Desk: Integrating Technological Innovation and Human-Centric Design," Dis2002, vol. 3: 399-405, Jun. 2002.

Klemmer, S., et al., "The Designer's Outpost: A Task-Centred Tangible Interface for Web Site Information Design,".

Lange, B: et al., "Insight Lab:An Immersive Team Environment Linking Paper, Displays, and Data," CHI 98 Apr. 18-23: 550-557 (1998).

MacKay, .W., et al., "Designing Interactive Paper: Lessons from three Augmented Reality Projects," p. 1-4.

Moran, T. et at., "Design and Technology for Collaborage: Collaborative Collages of Information on Physical Walls," CHI Letters vol. 1, 1: 197-206, (1999).

O'Hara, K., "A Comparison of Reading Paper and On-Line Documents," CHI97, Mar. 22-27: 335-342 (1997).

Piper, B. et al., "Illuminating Clay: A 3-DTangible Interface for Landscape Analysis" Paper: Hands-On Interface. vol. 1, Issue 1, CHI 2002: 355-362, (2002).

Rekimoto, J., "Pick-and-Drop: A Direct Manipulation Technique for Multiple Computer Environments," p. 1-8.

Rekimoto, J. et al., "DataTiles: A Modular Platform for Mixed Physical and Graphical Interactions," SIGCHI 01InterChi 93, Seattle, WA Mar. 31-Apr. 4, 2001.

Rekimoto, J., "SmartSkin: An Infrastructure for Freehand Manipulation on Interactive Surfaces," CHI 2002 Paper. Two-Handed Interaction, vol. 4, Issue 1, p. 113-120, Apr. 20-25, 2002.

Schilit, B. et al., "Beyond Paper: Supporting Active Reading with Free Form Digital Ink Annotations," Proceedings of CH198, p. 1-8 (1998).

Schwesig, C. et al., "Gummi: A Bendable Computer, " CHI 2004 Apr-24-29, p. 1-8 (2004).

Tognazzini, B. "Starfire the Annotated Script" Tog on Software Design, p. 1-27.

Wellner, P., "The DigitalDesk Calculator: Tangible Manipulation on a Desk Top Display," UIST 91, Hilton Head, South Carolina; p. 27-33; Nov. 11-13, 1991.

Weiser, M., "The Computer for the 21st Century," Scientific American Ubicomp Paper after Sci Am editing 09 (1991).

Holman, D., et al., "PaperWindows: Interaction Techniques for Digital Paper," CHI 2005 Papers: Physical Interaction, Apr. 2-7, Portland, Oregon, USA.

PCT International Search Report for International Application No. PCT/US2010/001921 filed on Jul. 7, 2010.

PCT Written Opinion of the International Searching Authority for International Application No. PCT/US2010/001921 filed on Jul. 7, 2010.

* cited by examiner

INTERACTION TECHNIQUES FOR FLEXIBLE DISPLAYS

CROSS-REFERENCE TO RELATED APPLICATIONS

This application is a continuation of application Ser. No. 11/731,447, filed on Mar. 30, 2007 now abandoned, and claims priority from U.S. Provisional Application Ser. No. 60/788,405, filed on Mar. 30, 2006.

Each of the applications and patents cited in this text, as well as each document or reference cited in each of the applications and patents (including during the prosecution of each issued patent; "application cited documents"), and each of the U.S. and foreign applications or patents corresponding to and/or claiming priority from any of these applications and patents, and each of the documents cited or referenced in each of the application cited documents, are hereby expressly incorporated herein by reference. More generally, documents or references are cited in this text, either in a Reference List before the claims, or in the text itself; and, each of these documents or references ("herein-cited references"), as well as each document or reference cited in each of the herein-cited references (including any manufacturer's specifications, instructions, etc.), is hereby expressly incorporated herein by reference. Documents incorporated by reference into this text may be employed in the practice of the invention.

FIELD OF THE INVENTION

The present invention relates generally to input and interaction techniques associated with flexible display devices.

BACKGROUND OF THE INVENTION

In recent years, considerable progress has been made towards the development of thin and flexible displays. U.S. Pat. No. 6,639,578 cites a process for creating an electronically addressable display that includes multiple printing operations, similar to a multi-color process in conventional screen printing. Likewise, U.S. Pat. Application No. 2006/0007368 cite a display device assembly comprising a flexible display device being rollable around an axis. A range of flexible electronic devices based on these technologies, including full color, high-resolution flexible OLED displays with a thickness of 0.2 mm are being introduced to the market (14). The goal of such efforts is to develop displays that resemble the superior handling, contrast and flexibility of real paper.

As part of this invention we devised an apparatus for tracking interaction techniques for flexible displays that uses a projection apparatus that projects images generated by a computer onto real paper, of which the shape is subsequently measured using a computer vision device. Deformation of the shape of the paper display is then used to manipulate in real time said images and/or associated computer functions displayed on said display. It should be noted that the category of displays to which this invention pertains is very different from the type of rigid-surface LCD displays cited in, for example, U.S. Pat. Nos. 6,567,068 or 6,573,883 which can be rotated around their respective axes but not deformed.

Prior art, which include bendable interfaces such as ShapeTape (1) and Gummi (20) demonstrates the value of incorporating the deformation of computing objects for use as input for computer processes. However, in this patent, we propose methods for interacting with flexible displays that rely on deformations of the surface structure of the display itself. While this extends work performed by Schwesig et al (17), which proposed a credit card sized computer that uses physical deformation of the device for browsing of visual information, it should be noted that said device did not incorporate a flexible material, and did not use deformation of the display. Instead, it relied on the use of touch sensors mounted on a rigid LCD-style display body.

The use of projection to simulate computer devices on three dimensional objects is also cited in prior art. SmartSkin (18) is an interactive surface that is sensitive to human finger gestures. With SmartSkin, the user can manipulate the contents of a digital back-projection desk using manual interaction. Similarly, Rekimoto's Pick and Drop (16) is a system that lets users drag and drop digital data among different computers by projection onto a physical object. In Ishii's Tangible User Interface (TUI) paradigm (5), interaction with projected digital information is provided through physical manipulation of real-world objects. In all of such systems, the input device is not the actual display itself, or the display is not on the actual input device. With DataTiles (17), Rekimoto et. al. proposed the use of plastic surfaces as widgets that with touch-sensitive control properties for manipulating data projected onto other plastic surfaces. Here, the display surfaces are again two-dimensional and rigid body.

In DigitalDesk (24), a physical desk is augmented with electronic input and display. A computer controlled camera and projector are positioned above the desk. Image processing is used to determine which page a user is pointing at. Object character recognition transfers content between real paper and electronic documents projected on the desk. Wellner demonstrates the use of his system with a calculator that blurs the boundaries between the digital and physical world by taking a printed number and transferring it into an electronic calculator. Interactive Paper (11) provides a framework for three prototypes. Ariel (11) merges the use of engineering drawings with electronic information by projecting digital drawings on real paper laid out on a planar surface. In Video Mosaic (11), a paper storyboard is used to edit video segments. Users annotate and organize video clips by spreading augmented paper over a large tabletop. Caméléon (11) simulates the use of paper flight strips by air traffic controllers, merging them with the digital world. Users interact with a tablet and touch sensitive screen to annotate and obtain data from the flight strips. Paper Augmented Digital Documents (3) are digital documents that are modified on a computer screen or on paper. Digital copies of a document are maintained in a central database and if needed, printed to paper using IR transparent ink. This is used to track annotations to documents using a special pen.

Insight Lab (9) is an immersive environment that seamlessly supports collaboration and creation of design requirement documents. Paper documents and whiteboards allow group members to sketch, annotate, and share work. The system uses bar code scanners to maintain the link between paper, whiteboard printouts, and digital information.

Xlibris (19) uses a tablet display and paper-like interface to include the affordances of paper while reading. Users can read a scanned image of a page and annotate it with digital ink. Annotations are captured and used to organize information. Scrolling has been removed from the system: pages are turned using a pressure sensor on the tablet. Users can also examine a thumbnail overview to select pages. Pages can be navigated by locating similar annotations across multiple documents. Fishkin et al. (2) describe embodied user interfaces that allow users to use physical gestures like page turning, card flipping, and pen annotation for interacting with documents. The system uses physical sensors to recognize these gestures. Due to space limitations we limit our review: other systems exist that link the digital and physical world through paper. Examples include Freestyle (10), Designers' Outpost (8), Collaborage (12), and Xax (6). One feature common to prior work in this area is the restriction of the use of physical paper to a flat surface. Many project onto or sense interaction in a coordinate system based on a rigid 2D surface only. In our system, by contrast, we use as many of the three dimensional affordances of flexible displays as possible.

In Illuminating Digital Clay (15), Piper et al. proposed the use of a laser scanner to determine the deformation of a clay mass. This deformation was in turn used to alter images projected upon the clay mass through a projection apparatus. The techniques presented in this patent are different in a number of ways. Firstly, our display unit is completely flexible, can be duplicated to work in unison with other displays of the same type and move freely in three-dimensional space. They can be folded 180 degrees around any axis or sub-axes, and as such completely implement the functionality of two-sided flexible displays. Secondly, rather than determining the overall shape of the object as a point cloud, our input techniques rely on determining the 3D location of specific marker points on the display. We subsequently determine the shape of the display by approximating a Bezier curve with control points that coincide with these marker locations, providing superior resolution. Thirdly, unlike Piper (15), we propose specific interaction techniques based on the 3D manipulation and folding of the display unit. The advantages of regular paper over the windowed display units used in standard desktop computing are manifold (21). In the Myth of the Paperless Office (21) Sellen analyzes the use of physical paper. She proposed a set of design principles for incorporating affordances of paper documents in the design of digital devices, such as 1) Support for Flexible Navigation, 2) Cross Document Use, 3) Annotation While Reading and 4) Interweaving of Reading and Writing.

Documents presented on paper can be moved in and out of work contexts with much greater ease than with current displays. Unlike GUI windows or rigid LCD displays, paper can be folded, rotated and stacked along many degrees of freedom (7). It can be annotated, navigated and shared using extremely simple gestural interaction techniques. Paper allows for greater flexibility in the way information is represented and stored, with a richer set of input techniques than currently possible with desktop displays. Conversely, display systems currently support properties unavailable in physical paper, such as easy distribution, archiving, querying and updating of documents. By merging the digital world of computing with the physical world of flexible displays we increase value of both technologies.

SUMMARY OF THE INVENTION

The present invention relates to a set of interaction techniques for obtaining input to a computer system based on methods and apparatus for detecting properties of the shape, location and orientation of flexible display surfaces, as determined through manual or gestural interactions of a user with said display surfaces. Such input may be used to alter graphical content and functionality displayed on said surfaces or some other display or computing system.

One aspect of the invention is a set of interaction techniques for manipulating graphical content and functionality displayed on flexible displays based on methods for detecting the shape, location and orientation of said displays in 3 dimensions and along 6 degrees of freedom, as determined through manual or gestural interaction by a user with said display.

Another aspect of the invention is a capture and projection system, used to simulate or otherwise implement a flexible display. Projecting computer graphics onto physical flexible materials allows for a seamless integration between images and multiple 3D surfaces of any shape or form, one that measures and corrects for 3D skew in real time.

Another aspect of the invention is the measurement of the deformation, orientation and/or location of flexible display surfaces, for the purpose of using said shape as input to the computer system associated with said display. In one embodiment of the invention, a Vicon Motion Capturing System (23) or equivalent computer vision system is used to measure the location in three dimensional space of retro-reflective markers affixed to or embedded within the surface of the flexible display unit. In another embodiment, movement is tracked through wireless accelerometers embedded into the flexible display surface in lieu of said retro-reflective markers, or deformations are tracked through some fiber optics embedded in the display surface.

One embodiment of the invention is the application of said interaction techniques to flexible displays that resemble paper. In another embodiment, the interaction techniques are applied to any form of polymer or organic light emitting diode-based electronic flexible display technology.

Another embodiment of the invention is the application of said interaction techniques to flexible displays that mimic or otherwise behave as materials other than paper, including but not limited to textiles whether or not worn on the human body, three-dimensional objects, liquids and the likes.

In another embodiment, interaction techniques apply to projection on the skin of live or dead human bodies, the shape of which is sensed via computer vision or embedded accelerometer devices.

Unless otherwise defined, all technical and scientific terms used herein have the same meaning as commonly understood by one of ordinary skill in the art to which this invention pertains. Although methods and materials similar or equivalent to those described herein can be used in the practice of the present invention, suitable methods and materials are described below. All publications, patent applications, patents, and other references mentioned herein are expressly incorporated by reference in their entirety. In cases of conflict, the present specification, including definitions, will control. In addition, materials, methods, and examples described herein are illustrative only and are not intended to be limiting.

Other features and advantages of the invention will be apparent from and are encompassed by the following detailed description and claims.

BRIEF DESCRIPTION OF THE DRAWINGS

The following Detailed Description, given by way of example, but not intended to limit the invention to specific embodiments described, may be understood in conjunction with the accompanying Figures, incorporated herein by reference, in which.

DETAILED DESCRIPTION OF THE INVENTION

Definitions

Figure 1:
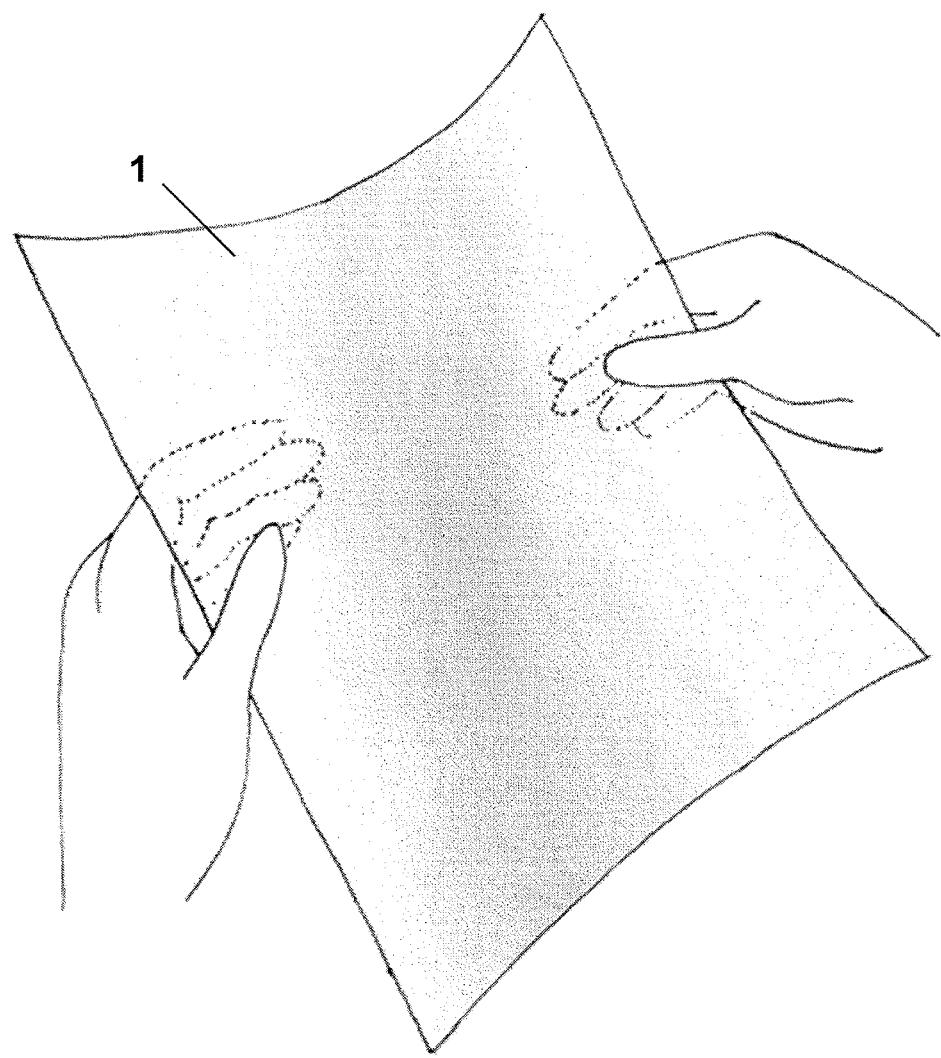
FIG. 1 shows a Hold Gesture with flexible display surface (1). Note that flexible display surfaces and fingers in FIG. 1 through 10 may include some (hidden) marker(s) (3) according to FIG. 11 or FIG. 12 that have not been included in the drawings for reasons of clarity.

"Flexible Display" or "Flexible Display Surface" means any display surface made of any material, including, but not limited to displays constituted by projection and including, but not limited to real and electronic paper known in the art, based on Organic Light Emitting Devices or other forms of thin, thin-film or e-ink based technologies such as, e.g., described in U.S. Pat. No. 6,639,578, cardboard, Liquid Crystal Diode(s), Light Emitting Diode(s), Stacked Organic, Transparent Organic or Polymer Light Emitting Device(s) or Diode(s), Optical Fibre(s), Styrofoam, Plastic(s), Epoxy Resin, Textiles, E-textiles, or clothing, skin or body elements of a human or other organism, living or dead, Carbon-based materials, or any other three-dimensional object or model, including but not limited to architectural models, and product packaging. Within the scope of this application, the term is can be interpreted interchangeably as paper, document or paper window, but will not be limited to such interpretation.

The term "Paper Window" refers to one embodiment of a flexible display surface implemented by tracking the shape, orientation and location of a sheet of paper, projecting back and image onto said sheet of paper using a projection system, such that it constitutes a flexible electronic display. Within the scope of this application, the term is may be interpreted as interchangeable with flexible display, flexible display surface or document, but the terms flexible display, document and flexible display surface shall not be limited to such interpretation.

The term "document" is synonymous for Flexible Display or Flexible Display Surface.

"Marker" refers to a device that is affixed to a specific location on a flexible display surface for the purpose of tracking the position or orientation of said location on said surface. Said marker may consist of a small half-sphere made of material that reflects light in the infrared spectrum for the purpose of tracking location with an infrared computer vision camera. Said marker may also consist of an accelerometer that reports to a computer system for the purpose of computing the location of said marker, or any other type of location tracking system known in the art. A similar term used in this context is "point."

"Fold" is synonymous with "Bend," wherein folding is interpreted to typically be limited to a horizontal or vertical axis of the surface, whereas Bends can occur along any axis (2). Folding does not necessary lead to a crease.

Interaction Styles

Position and shape of flexible displays can be adjusted for various tasks: these displays can be spread about the desk, organized in stacks, or held close for a detailed view. Direct manipulation takes place with the paper display itself: by selecting and pointing using the fingers, or with a digital pen. The grammar of the interaction styles provided by this invention follows that of natural manipulation of paper and other flexible materials that hold information.

FIGS. 1 through 10 show a set of gestures based on deformations and location of the flexible display(s). These gestures provide the basic units of interaction with the system:

Hold. Users can hold a flexible display with one or two hands during use. The currently held display is the active document (FIG. 1).

Figure 2:
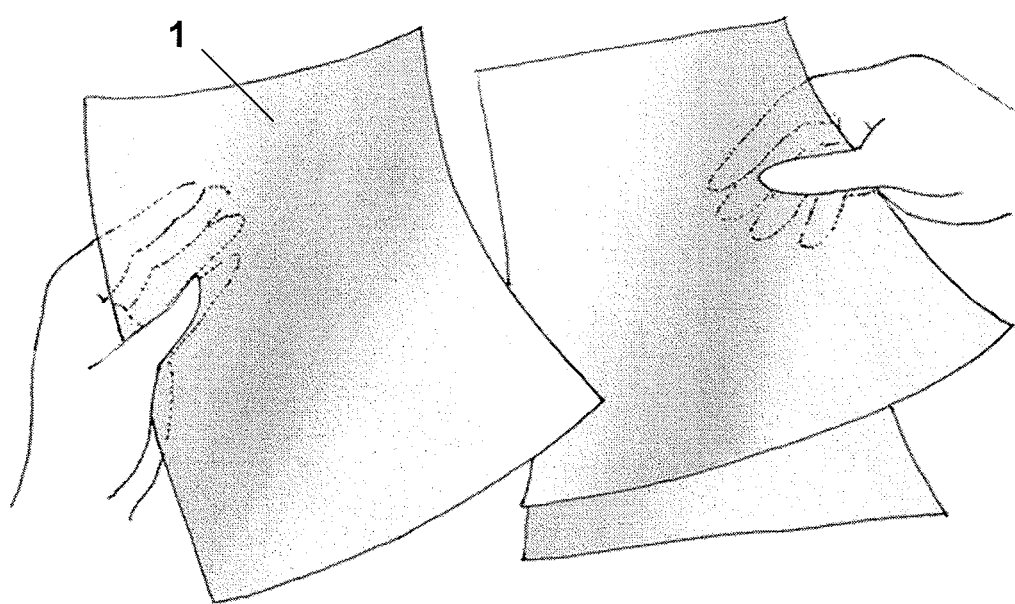
FIG. 2 shows a Collocate Gesture with flexible display surfaces (1).

Collocate. FIG. 2 shows the use of spatial arrangement of the flexible display(s) for organizing or rearranging information on said display(s). In one embodiment, collocating multiple flexible displays allows image contents to be automatically spread or enlarged across multiple flexible displays that are collocated.

Figure 3:
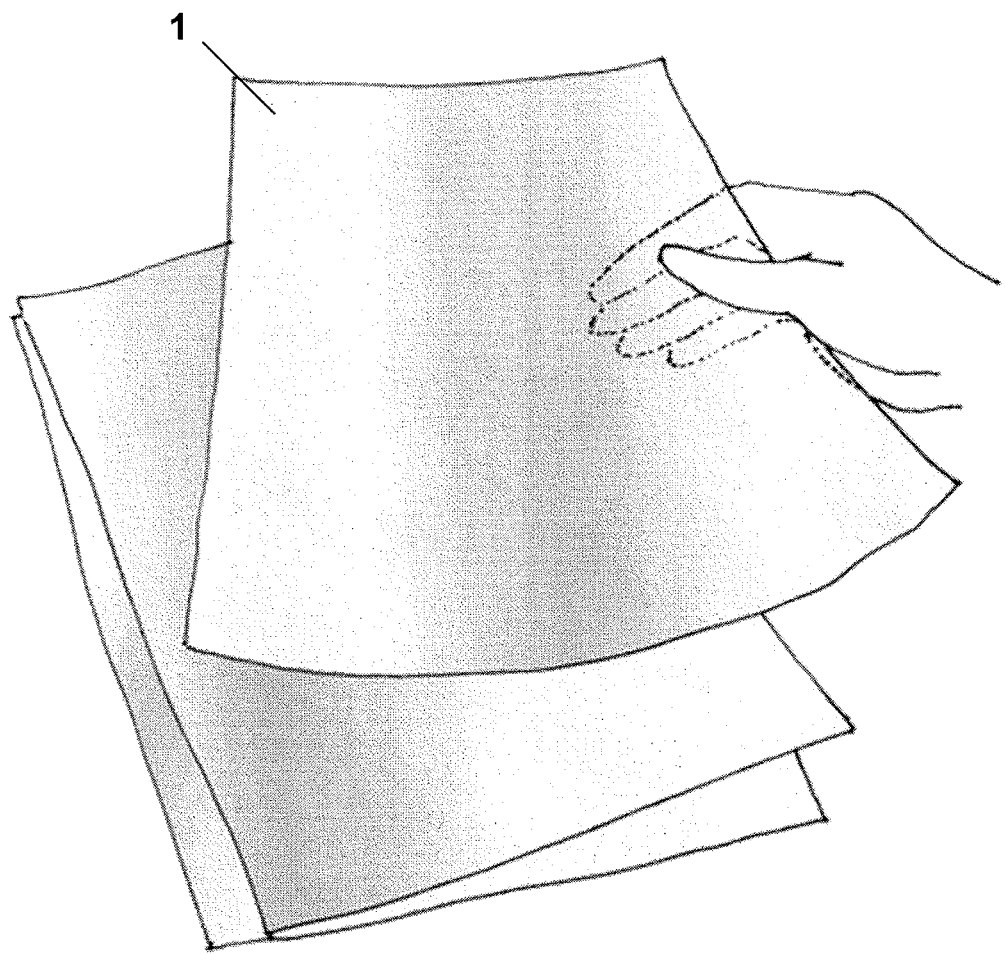
FIG. 3 shows a Collate Gesture with flexible display surfaces (1).

Collate. FIG. 3 shows how users may stack flexible displays, organizing said displays in piles on a desk. Such physical organization is reflected in the digital world by semantically associating or otherwise relating computer content of the displays, be it files, web-based or other information, located in a database, on a server, file system or the like, for example, by sorting such computer content according to some property of the physical organization of the displays.

Figure 4:
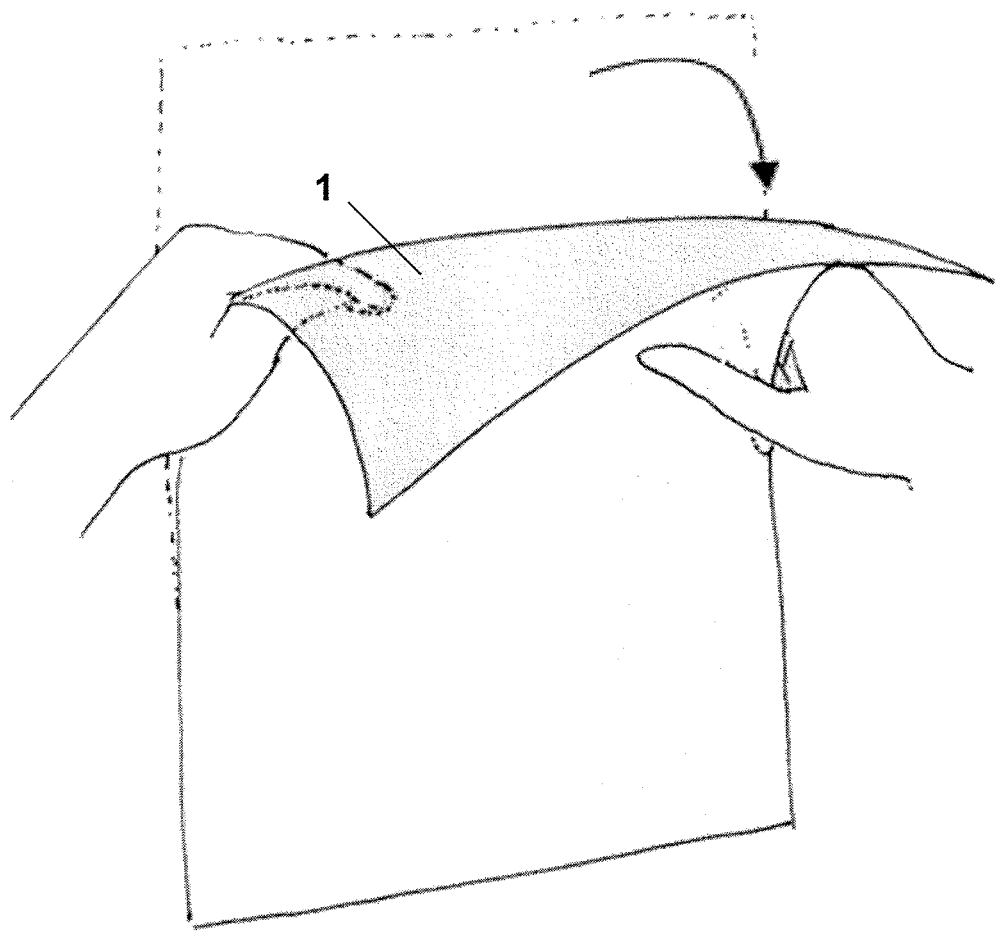
FIG. 4 shows a Flip Gesture, Fold and Half-fold Gestures with flexible display surface (1).

Flip or Turn. FIG. 4 shows how users may flip or turn the flexible display by folding it over its x or y axis, thus revealing the other side of the display. Flipping or turning the flexible display around an axis may reveal information that is stored contiguously to the information displayed on the edge of the screen. Note that this flipping or turning gesture is distinct from that of rotating a rigid display surface, in that the folds that occur in the display in the process of turning or flipping the display around its axes are used in detecting said turn or flip. In single page documents, a flip gesture around the x axis may, in a non-limiting example, scroll the associated page content in the direction opposite to that of the gesture. In this case, the flexible display is flipped around the x axis, such that the bottom of the display is lifted up, then folder over to the top. Here, the associated graphical content scrolls down, thus revealing content below what is currently displayed on the display. The opposite gesture, lifting the top of the display, then folding it over to the bottom of the display, causes content to scroll up, revealing information above what is currently displayed. In the embodiment of multi-page documents, flipping gestures around the x-axis may be used by the application to navigate to the prior or next page of said document, pending the directionality of the gesture. In the embodiment of a web browser, said gesture may be used to navigate to the previous or next page of the browsing history, pending the directionality of the gesture.

In another embodiment, the flexible display is flipped around the y axis, such that the right hand side of the display is folded up, then over to the left. This may cause content to scroll to the right, revealing information to the right of what is currently on display. The opposite gesture, folding the left side of the display up then over to the right, may cause content to scroll to the left, revealing information to the left of what is currently on display. In the embodiment of multi-page documents, flipping gestures around the y-axis may be used by the application to navigate to the prior or next page of said document, pending the directionality of the gesture. In the embodiment of a web browser, said gesture may be used to navigate to the previous or next page of the browsing history, pending the directionality of the gesture.

Fold. Note that wherever the term "Fold" is used it can be substituted for the term "Bend" and vice versa, wherein folding is interpreted to typically be limited to a horizontal or vertical axes of the surface. Where folding a flexible display around either or both its horizontal or vertical axis, either in sequence or simultaneously, serves as a means of input to the software that alters the image content of the document, or affects associated computing functionality (see FIG. 4). As a non-limiting example, this may cause objects displayed in the document to be moved to the center of gravity of the fold, or sorted according to a property displayed in the center of gravity of the fold. As another non-limiting example, following the gravity path of the fold that would exist if water was run through that fold, it may cause objects to be moved from one flexible display to a second flexible display placed underneath it:

Half fold. Where partly folding a flexible display on one side or corner of the Document causes a scroll, or the next or previous page in the associated file content to be displayed (FIG. 4).

Semi-permanent fold. Where the act of folding a flexible display around either its horizontal or vertical axis, or both, in such way that it remains in a semi-permanent folded state after release, serves as input to a computing system. In a non-limiting example, folding causes any contents associated with flexible displays to be digitally archived. In another non-limiting example, the unfolding of the flexible display causes any contents associated with said flexible display to be un-archived and displayed on said flexible display. In another non-limiting example, said flexible display would reduce its power consumption upon a semi-permanent fold, increasing power consumption upon unfold (FIG. 4).

Figure 5:
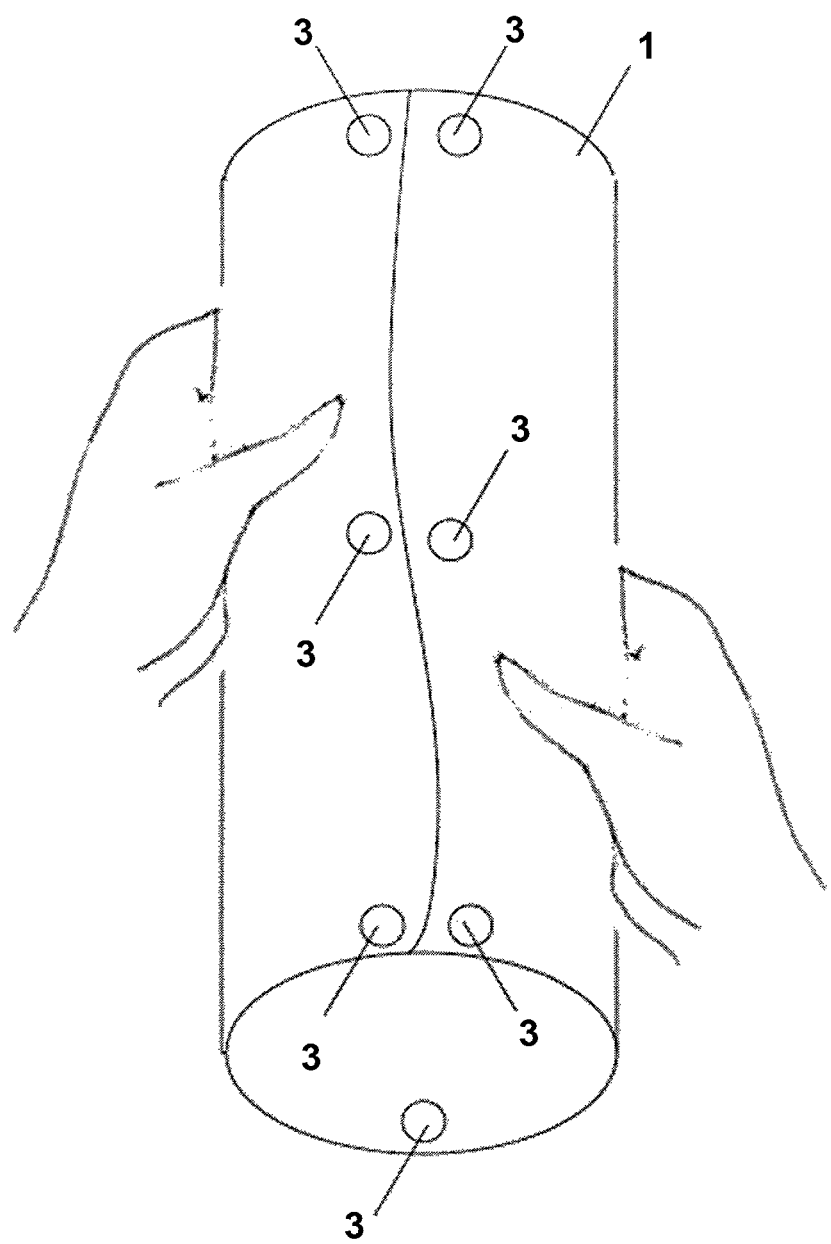
FIG. 5 shows a Roll Gesture with flexible display surface (1) with markers (3).
Figure 6:
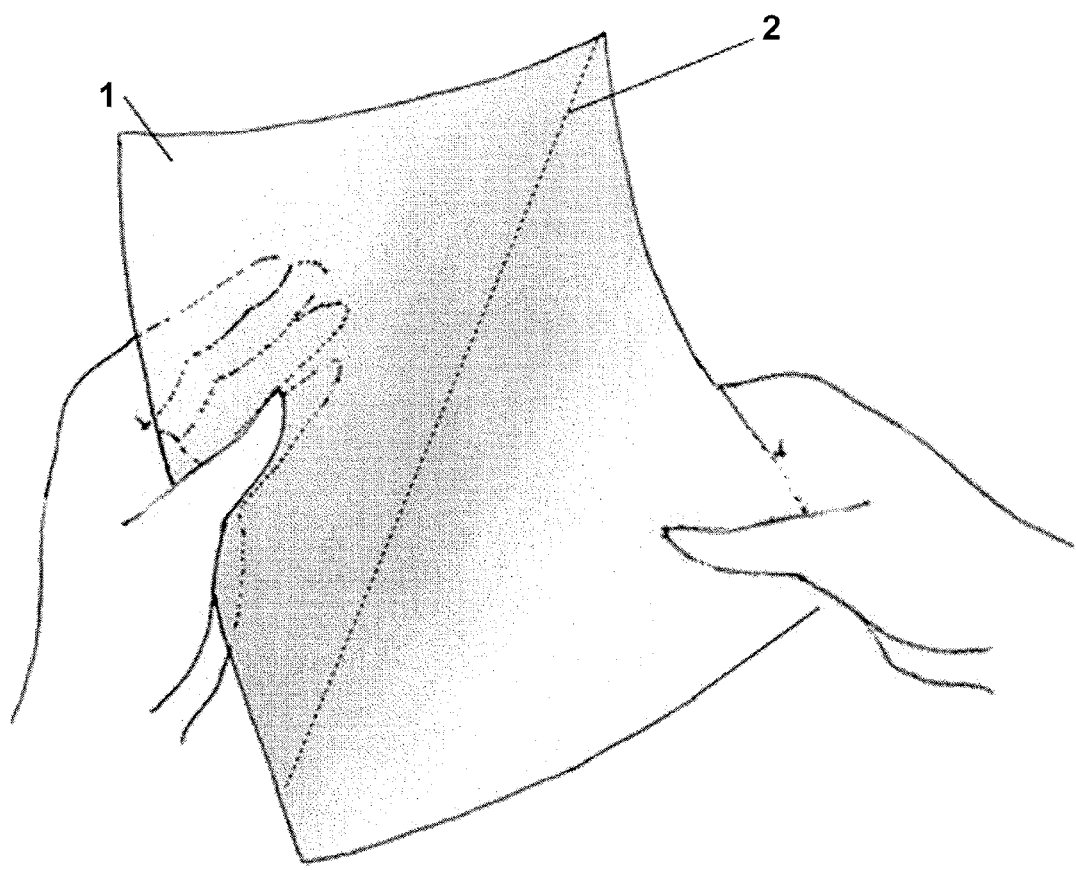
FIG. 6 shows a Bend Gesture with flexible display surface (1) and foldline (2).
Figure 7:
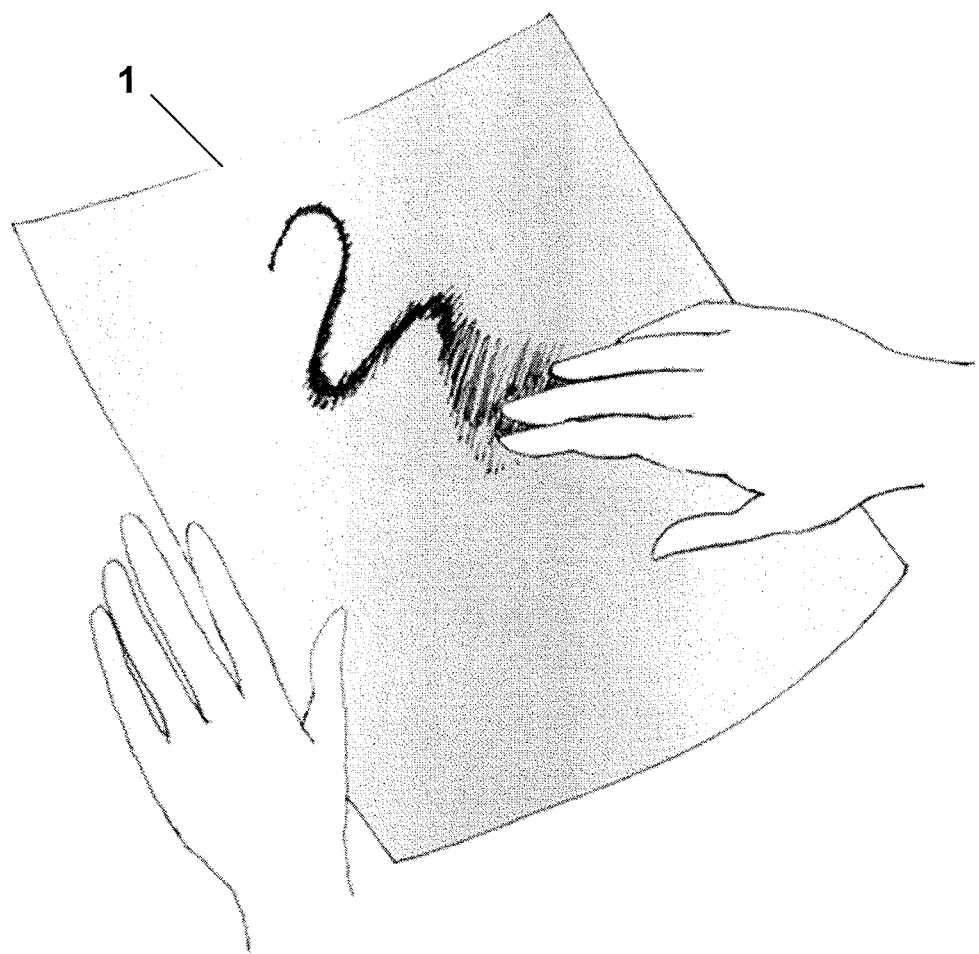
FIG. 7 shows a Rub Gesture with flexible display surface (1).
Figure 8:
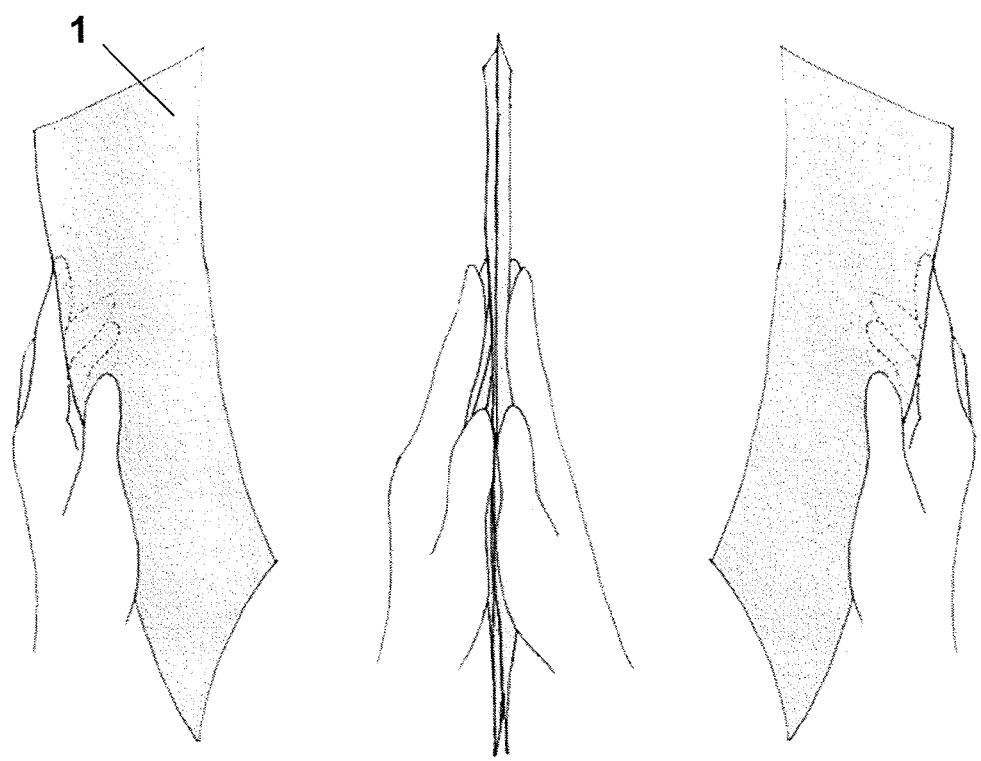
FIG. 8 shows a Staple Gesture with flexible display surface (1).
Figure 9:
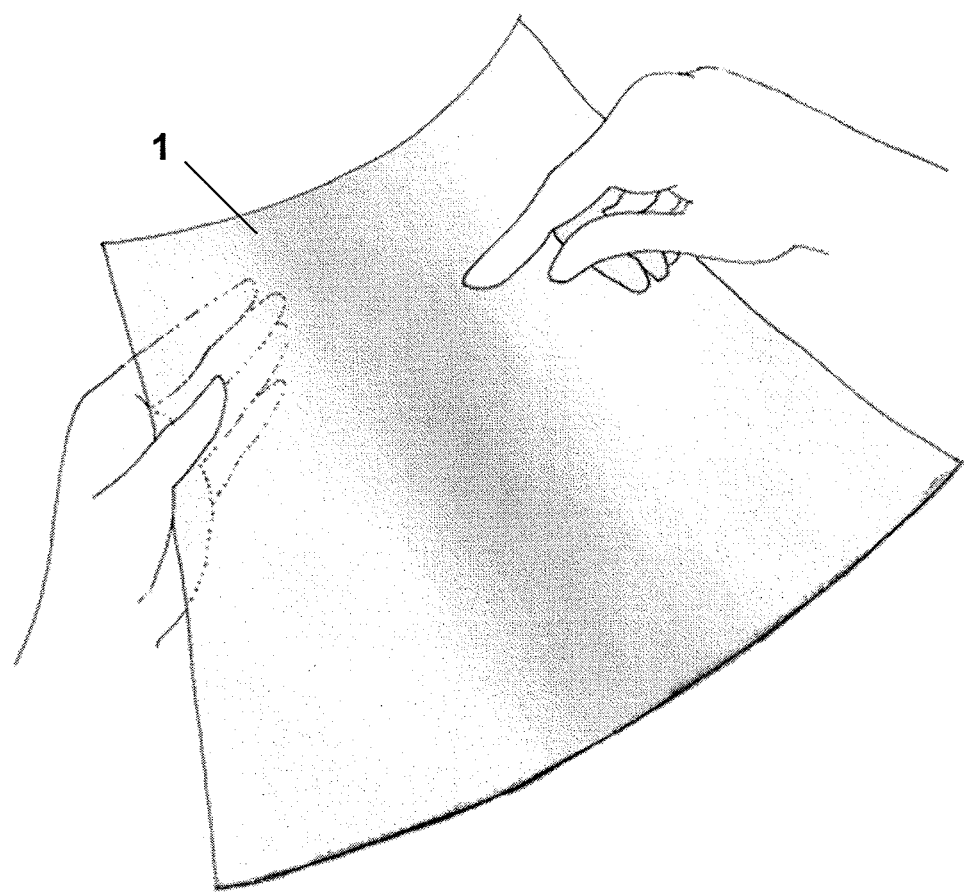
FIG. 9 shows a Pointing Gesture with flexible display surface (1).
Figure 10:
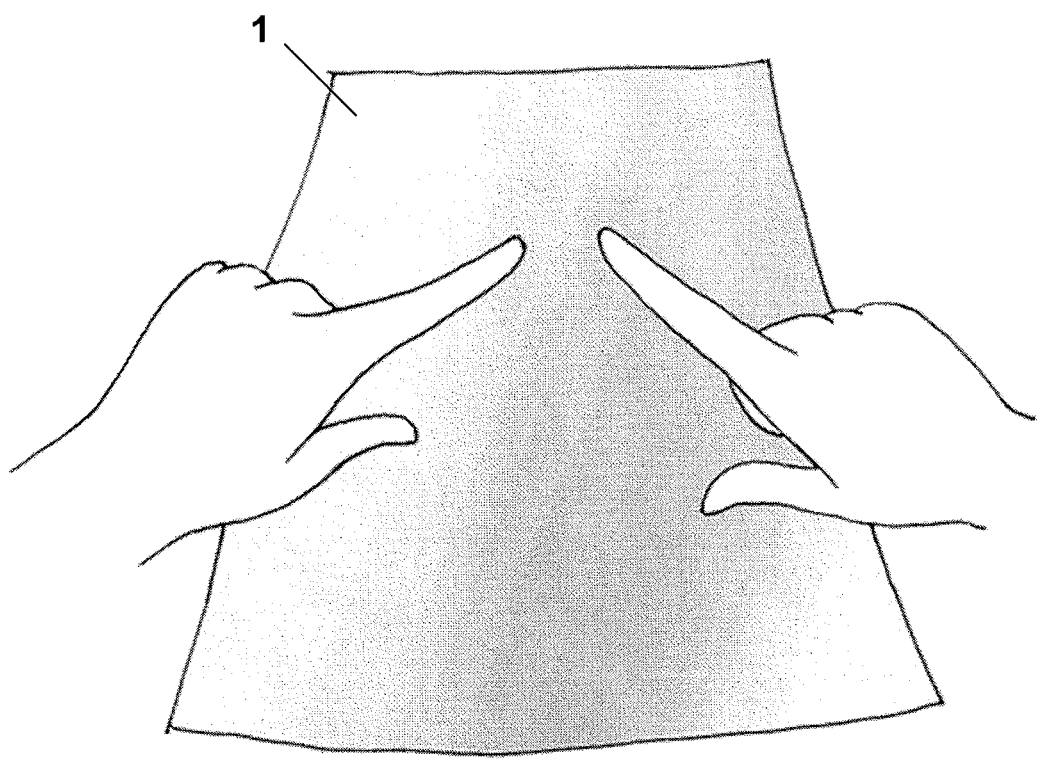
FIG. 10 shows a Multi-handed Pointing Gesture with flexible display surface (1).

Roll. Where the act of changing the shape of a flexible display such that said shape transitions from planar to cylindrical or vice versa serves as input to a computing system. In a non-limiting example, this causes any contents associated with the flexible display to be digitally archived upon a transition from planar to cylindrical shape (rolling up), and to be un-archived and displayed onto said flexible display upon a transition from cylindrical to planar shape (unrolling). In another non-limiting example, rolling up a display causes it to turn off, while unrolling a display causes it to turn on, or display content (FIG. 5).

Bend. Where bending a flexible display around any axes serves as input to a computing system. Bend may produce some visible or invisible fold line (2) that may be used to select information on said display, for example, to determine a column of data properties in a spreadsheet that should be used for sorting. In another non-limiting example, a bending action causes graphical information to be transformed such that it follows the curvature of the flexible display, either in two or three dimensions. The release of a bending action causes the contents associated with the flexible display to be returned to its original shape. Alternatively, deformations obtained through bending may become permanent upon release of the bending action. (See FIG. 6).

Rub. The rubbing gesture allows users to transfer content between two or more flexible displays, or between a flexible display and a computing peripheral (see FIG. 7). The rubbing gesture is detected by measuring back and forth motion of the hand on the display, typically horizontally. This gesture is typically interpreted such that information from the top display is transferred, that is either copied or moved, to the display(s) or peripheral(s) directly beneath it. However, if the top display is not associated with any content (i.e., is empty) it becomes the destination and the object directly beneath the display becomes the source of the information transfer. In a non-limiting example, if a flexible display is placed top of a printer peripheral, the rubbing gesture would cause its content to be printed on said printer. In another non-limiting example, when an empty flexible display is rubbed on top of a computer screen, the active window on that screen will be transferred to the flexible display such that it displays on said display. When the flexible display contains content, said content is transferred back to the computer screen instead. In a final non-limiting example, when one flexible display is placed on top of another flexible display the rubbing gesture, applied to the top display, causes information to be copied from the top to the bottom display if the top display holds content, and from the bottom to the top display if the top display is empty. In all examples pertaining to the rubbing gesture, information transfer may be limited to those graphical objects that are currently selected on the source display.

Staple. Like a physical staple linking a set of pages, two or more flexible displays may be placed together such that one impacts the second with a detectable force that is over a set threshold (see FIG. 8). This gesture may be used to clone the information associated with the moving flexible display onto the stationary destination document, given that the destination flexible display is empty. If the destination display is not empty, the action shall be identical to that of the collate gesture.

Point. Users can point at the content of a paper window using their fingers or a digital pen (see FIG. 9). Fingers and pens are tracked by either computer vision, accelerometers, or some other means. Tapping the flexible display once performs a single click. A double click is issued by tapping the flexible display twice in rapid succession.

Two-handed Pointing: Two-handed pointing allows users to select disjoint items on a single flexible display, or across multiple flexible displays that are collocated (see FIG. 10).

Interaction Techniques

We designed a number of techniques for accomplishing basic tasks using our gesture set, according to the following non-limiting examples:

Activate. In GUIs, the active document is selected for editing by clicking on its corresponding window. If only one window is associated with one flexible display, the hold gesture can be used to activate that window, making it the window that receives input operations. The flexible display remains active until another flexible display is picked up and held by the user. Although this technique seems quite natural, it may be problematic when using an input device such as the keyboard. For example, a user may be reading from one flexible display while typing in another flexible display. To address this concern, users can bind their keyboard to the active window using a key.

Select. Items on a flexible display can be selected through a one-handed or two-handed pointing gesture. A user opens an item on a page for detailed inspection by pointing at it, and tapping it twice. Two-handed pointing allows parallel use of the hands to select disjoint items on a page. For example, sets of icons can be grouped quickly by placing one finger on the first icon in the set and then tapping one or more icons with the index finger of the other hand. Typically, flexible displays are placed on a flat surface when performing this gesture. Two-handed pointing can also be used to select items using rubber banding techniques. With this technique, any items within the rubber band, bounded by the location of the two finger tips, are selected upon release. Alternatively, objects on a screen can be selected as those located on a foldline or double foldline (2) produced by bends (see FIG. 6).

Copy & Paste. In GUIs, copying and pasting of information is typically performed using four discrete steps: (1) specifying the source, (2) issuing the copy, (3) specifying the destination of the paste and (4) issuing the paste. In flexible displays, these actions can be merged into simple rubbing gestures:

Transfer to flexible display. Computer windows can be transferred to a flexible display by rubbing a blank flexible display onto the computer screen. The window content is transferred to the flexible display upon peeling the flexible display off the computer screen. The process is reversed when transferring a document displayed on a flexible display back to the computer screen.

Copy Between Displays. Users can copy content from one flexible display to the next. This is achieved by placing a flexible display on top of a blank display. The content of the source page is transferred by rubbing it onto the blank display. If prior selections exist on the source page, only highlighted items are transferred. Scroll. Users can scroll through content of a flexible display in discrete units, or pages. Scrolling action is initiated by half-folding, or folding then flipping the flexible displays around its horizontal or vertical axis with a flip or fold gesture. In a non-limiting example, this causes the next page in the associated content to be displayed on the back side of the flexible display. Users can scroll back by reversing the flip.

Browse. Flips or folds around the horizontal or vertical axis may also be used to specify back and forward actions that are application specific. For example, when browsing the web, a left flip may cause the previous page to be loaded. To return to the current page, users would issue a right flip. The use of spatially orthogonal flips allows users to scroll and navigate a document independently.

Views. The staple gesture can be used to generate parallel copies of a document on multiple flexible displays. Users can open a new view into the same document space by issuing a staple gesture impacting a blank display with a source display. This, for example, allows users to edit disjoint parts of the document simultaneously using two separate flexible displays. Alternatively, users can display multiple pages in a document simultaneously by placing a blank flexible display beside a source flexible display, thus enlarging the view according to the collocate gesture. Rubbing across both displays causes the system to display the next page of the source document onto the blank flexible display that is beside it.

Resize/Scale. Documents projected on a flexible display can be scaled using one of two techniques. Firstly, the content of a display can be zoomed within the document. Secondly, users can transfer the source material to a flexible display with a larger size. This is achieved by rubbing the source display onto a larger display. Upon transfer, the content automatically resizes to fit the larger format.

Share. Collocated users often share information by emailing or printing out documents. We implemented two ways of sharing: slave and copy. When slaving a document, a user issues a stapling gesture to clone the source onto a blank display. In the second technique, the source is copied to a blank display using the rubbing gesture, then handed to the group member.

Open. Users can use flexible displays, or other objects, including computer peripherals such as scanners and copiers as digital stationary. Stationary pages are blank flexible displays that only display a set of application icons. Users can open a new document on the flexible display by tapping an application icon. Users may retrieve content from a scanner or email appliance by rubbing it onto said scanner or appliance. Users may also put the display or associated computing resources in a state of reduced energy use through a roll or semi-permanent fold gesture, where said condition is reversed upon unrolling or unfolding said display.

Save. A document is saved by performing the rubbing gesture on a single flexible display, typically while it is placed on a surface.

Close. Content displayed on a flexible display may be closed by transferring its contents to a desktop computer using a rubbing gesture. Content may be erased by crumbling or shaking the flexible display.

Apparatus of the Invention

Figure 11:
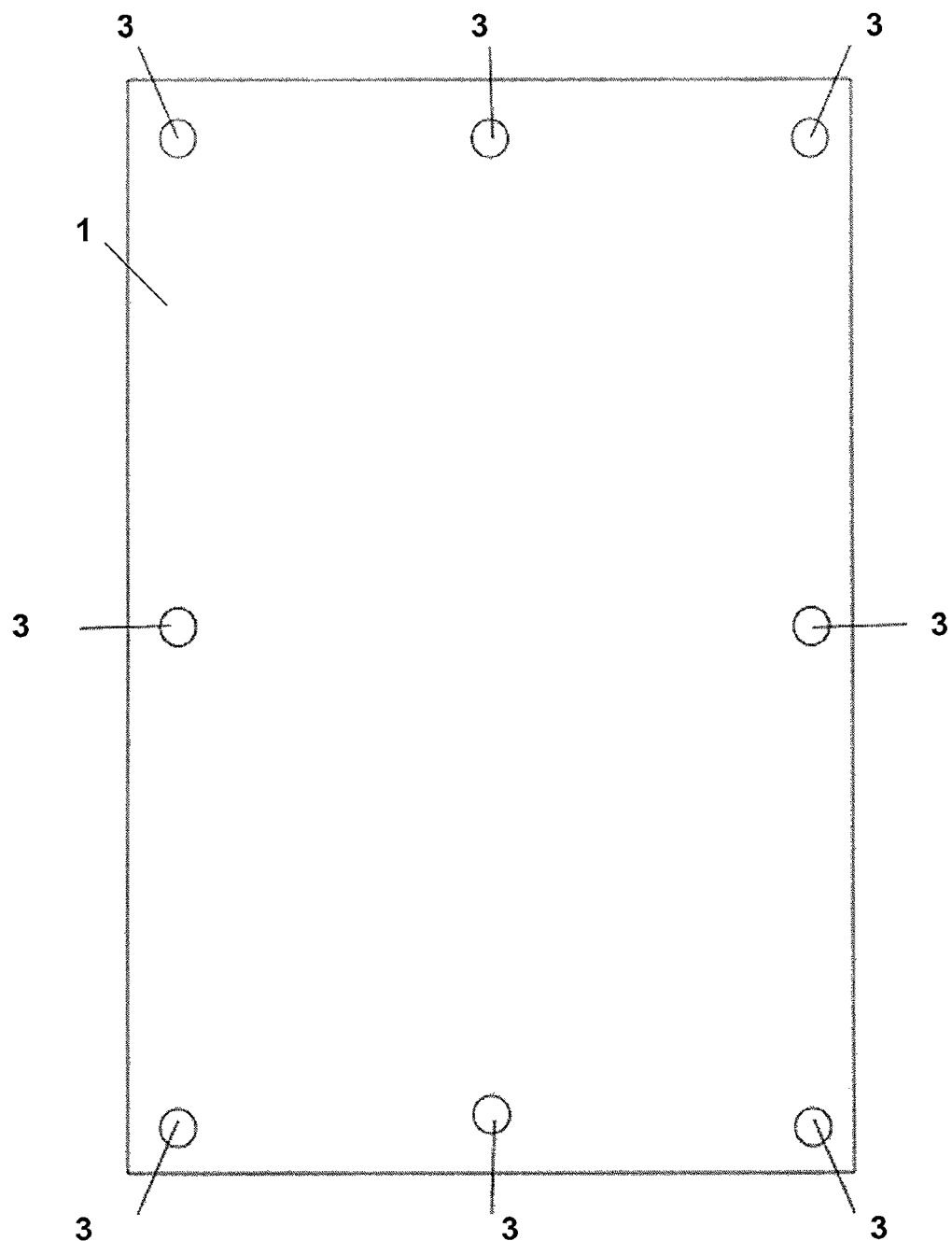
FIG. 11 shows a Flexible display surface (1) with markers (3).
Figure 12:
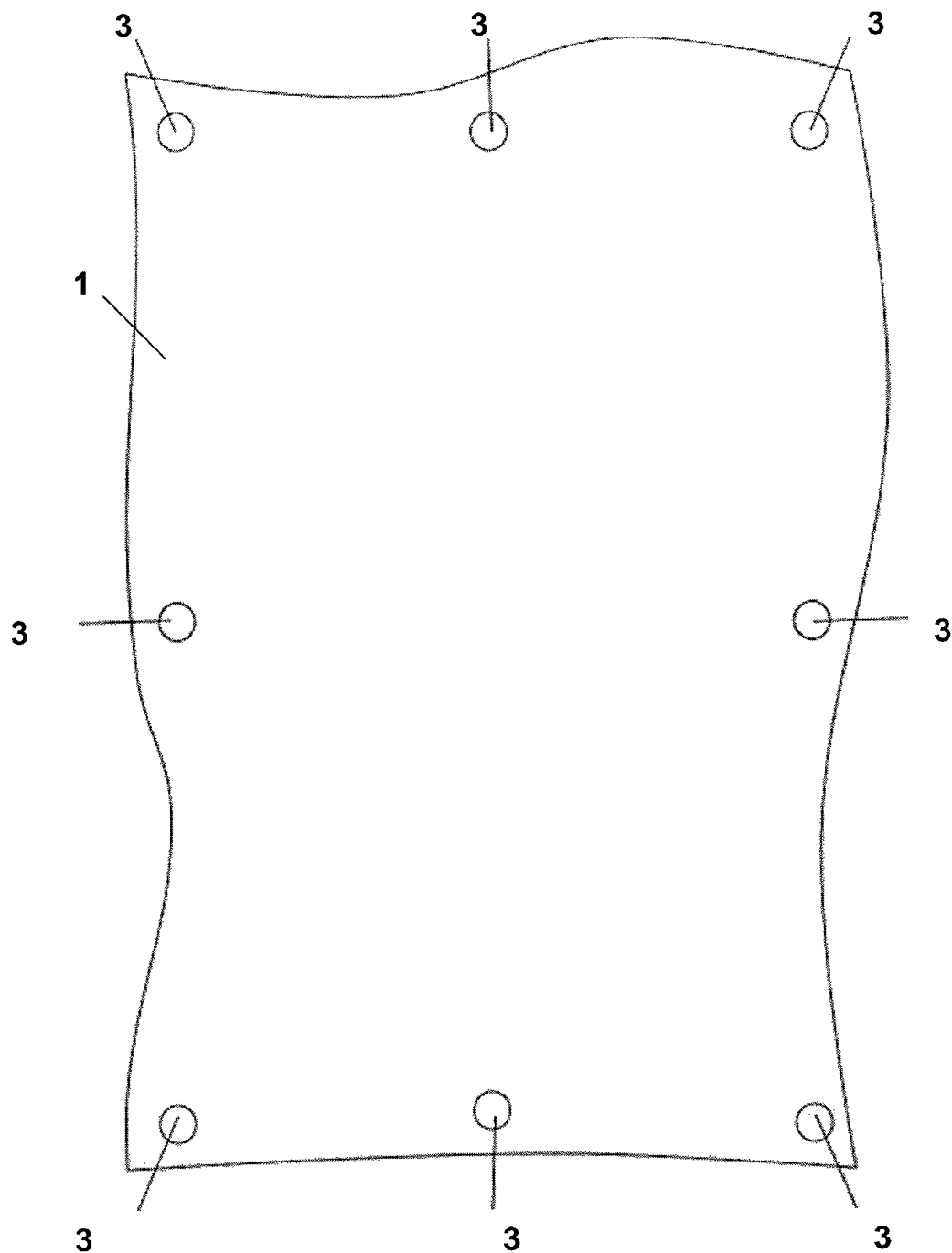
FIG. 12 shows another embodiment of flexible display surface (1) made of fabric or similar materials with markers (3).
Figure 13:
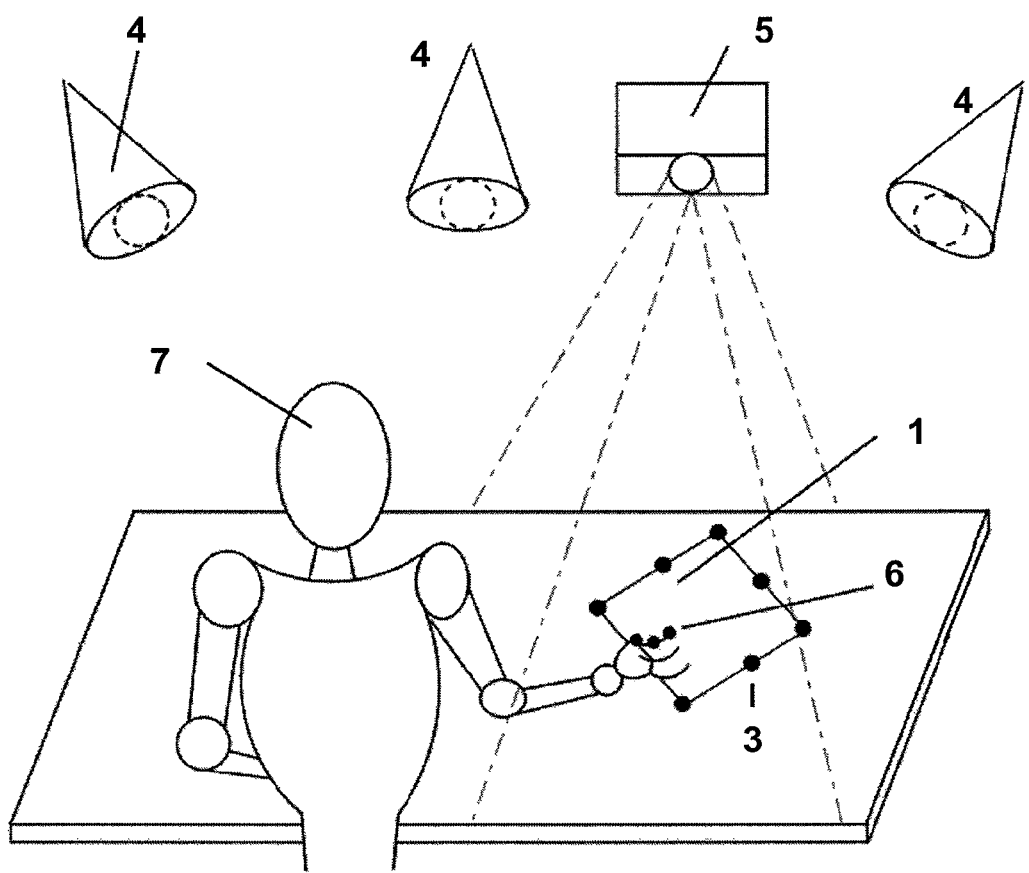
FIG. 13 shows a System apparatus for tracking flexible display surface (1) through computer vision cameras emitting infrared light (4) mounted above a workspace with user (7), where markers (3) affixed to flexible display surface (1) reflect infrared light emitted by computer vision cameras (4). Optionally, digital projection system (5) projects images of the modeled flexible display surfaces rendered with textures back onto said flexible display surfaces.

In one embodiment of the invention, a real piece of flexible, curved or three-dimensional material, such as a cardboard model, piece of paper, textile or human skin may be tracked using computer vision, modeled, texture mapped and then projected back upon the object. Alternatively, the computer vision methods may simply be used to track the shape, orientation and location of a flexible display that does not require the projection component. This in effect implements a projected two-sided flexible display surface that follows the movement, shape and curves of any object in six degrees of freedom. An overview of the elements required for such embodiment of the flexible display (1) is provided in FIGS. 10 and 11. In this non-limiting example, the surface is augmented with infrared (IR) reflective marker dots (3). FIG. 13 shows the elements of the capture and projection system, where the fingers (6) of the user (7) are tracked by affixing three or more IR marker dots to the digit. A digital projection unit (5) allows for projection of the image onto the scene, and a set of infrared or motion capturing cameras (4) allows tracking of the shape orientation and location of the sheets of paper. The following section discusses each of the above apparatus elements, illustrating their relationship to other objects in this embodiment of the system. This example does not withstand other possible embodiments of the apparatus, which include accelerometers embedded in lieu of the marker dots, and mounted on flexible displays. In such embodiment, the wireless accelerometers report acceleration of the marked positions of the material in three dimensions to a host computer so as to determine their absolute or relative location.

In one embodiment, the computer vision component uses a Vicon (23) tracker or equivalent computer vision system that can capture three dimensional motion data of retro-reflective markers mounted on the material. Our setup consists of 12 cameras (4) that surround the user's work environment, capturing three dimensional movement of all retro-reflective markers (3) within a workspace of 20'×10' (see FIG. 13). The system then uses the Vicon data to reconstruct a complete three-dimensional representation that maps the shape, location and orientation of each flexible display surface in the scene.

In this embodiment, an initial process of modeling the flexible display is required before obtaining the marker data. First, a Range of Motion (ROM) trial is captured that describes typical movements of the flexible display through the environment. This data is used to reconstruct a three dimensional model that represents the flexible display. Vicon software calibrates the ROM trial to the model and uses it to understand the movements of the flexible display material during a real-time capture, effectively mapping each marker dot on the surface to a corresponding location on the model of the flexible display in memory. To obtain marker data, we modified sample code that is available as part of Vicon's Real Time Development Kit (23).

As said, each flexible display surface within the workspace is augmented with IR reflective markers, accelerometers and/or optic fibres that allow shape, deformation, orientation and location of said surface to be computed. In the embodiment of a paper sheet, or paper-shaped flexible display surface, the markers are affixed to form an eight point grid (see FIGS. 10 and 11). In the embodiment where computer vision is used, a graphics engine interfaces with the Vicon server, which streams marker data to our modeling component. In the embodiment where accelerometers are used, coordinates or relative coordinates of the markers are computed from the acceleration of said markers, and provided to our modeling component. The modeling component subsequently constructs a three-dimensional model in OpenGL of each flexible display surface that is tracked by the system. The center point of the flexible display surface is determined by averaging between the markers on said surface. Bezier curve analysis of marker locations is used to construct a fluid model of the flexible display surface shape, where Bezier control points correspond with the location of markers on the display surface. Subsequent analysis of the movement of said surface is used to detect the various gestures.

Applications that provide content to the flexible displays run on an associated computer. In cases where the flexible display surface consists of a polymer flexible display capable of displaying data without projection, application windows are simply transferred and displayed on said display. In the case of a projected flexible display, application windows are first rendered off-screen into the OpenGL graphics engine. The graphics engine performs real-time screen captures, and maps a computer image to the three dimensional OpenGL model of the display surface. The digital projector then projects an inverse camera view back onto the flexible display surface. Back projecting the transformed OpenGL model automatically corrects for any skew caused by the shape of the flexible display surface, effective synchronizing the two. The graphics engine similarly models fingers and pens in the environment, posting this information to the off-screen window for processing as cursor movements. Alternatively, input from pens, fingers or other input devices can be obtained through other methods known in the art. In this non-limiting example, fingers (6) of the user (7) are tracked by augmenting them with 3 IR reflective markers (3). Sensors are placed evenly from the tip of the finger up to the base knuckle. Pens are tracked similarly throughout the environment. The intersection of a finger or pen with a flexible display surface is calculated using planar geometry. When the pen or finger is sufficiently close, its tip is projected onto the plane of the flexible display surface. The position of the tip is then related to the length and width of the display. The x and y position of the point on the display (1) is calculated using simple trigonometry. When the pen or finger touches the display, the input device is engaged.

Imaging

In the embodiment of a projected flexible display, computer images or windows are rendered onto the paper by a digital projector (5) positioned above the workspace. The projector is placed such that it allows a clear line of sight with the flexible display surface between zero and forty-five degrees of visual angle. Using one projector introduces a set of tradeoffs. For example, positioning the projector close to the scene improves the image quality but reduces the overall usable space, and vice versa. Alternatively a set of multiple projectors can be used to render onto the flexible display surface as it travels throughout the environment of the user.

Initially, a calibration procedure is required to pair the physical position of the flexible display surface and the digital output of the projector. This is accomplished by adjusting the position, rotation, and size of the projector output until it matches the dimensions of the physical display surface.

Gesture Analysis

In the following section, the term "marker" is interchangeable with the term "accelerometer". Understanding the physical motion of paper and other materials in the system requires a combination of approaches. For gestures such as stapling, it is relatively easy to recognize when two flexible displays are rapidly moved towards each other. However, flipping requires knowledge of a flexible display surface's prior state. To recognize this event, the z location of markers at the top and bottom of the page is tracked. During a vertical or horizontal half-rotation, the relative location on the z dimension is exchanged between markers. The movement of the markers is compared to their previous position to determine the direction of the flip, fold or bend.

To detect more advanced gestures, like rubbing, marker data is recorded over multiple trials and then isolated in the data. Once located, the gesture is normalized and is used to calculate a distance vector for each component of the fingertip's movement. The system uses this distance vector to establish a confidence value. If this value passes a predetermined threshold the system recognizes the gesture, and if such gesture occurs near the display surface, a rubbing event is issued to the application.

EXAMPLES

Example 1

Photo Collage

There are many usage scenarios that would benefit from the functionality provided by the invention. One such non-limiting example is the selection of photos for printout from a digital photo database containing raw footage. Our design was inspired by the use of contact sheets by professional photographers. Users can compose a photo collage using two flexible displays, selecting a photo on one overview display and then rubbing it onto the second display with a rubbing gesture. This scenario shows the use of flexible display input as a focus and context technique, with one display providing a thumbnail overview of the database, and the other display offering a more detailed view.

Users can select thumbnails by pointing at the source page, or by selecting rows through producing a foldline with a bend gesture. By crossing two fold lines, a single photo or object may be selected. Thumbnails that appear rotated can be turned using a simple pivoting action of the index finger. After selection, thumbnails are transferred to the destination page through a rubbing gesture. After the copy, thumbnails may resize to fit the destination page. When done, the content of the destination flexible display can be printed by performing a rubbing gesture onto a printer. The printer location is tracked similarly to that of the flexible display, and is known to the system. Gestures supported by the invention can also be used to edit photos prior to selection. For example, photos are cropped by selecting part of the image with a two-handed gesture, and then rubbing the selection onto a destination flexible display. Photos can be enlarged by rubbing them onto a larger flexible display.

Example 2

Flexible Cardboard Game

In this non-limiting embodiment, the invention is used to implement a computer game that displays its graphic animations onto physical game board pieces. Said pieces may consist of cardboard that is tracked and projected upon using the apparatus described in this invention, or electronic paper, LCD, e-ink, OLED or other forms of thin, or thin-film displays. The well-known board game Settlers of Catan consists of a game board design in which hexagonal pieces with printed functionality can be placed differently in each game, allowing for a game board that is different each game. Each hexagonal piece, or hex, represents a raw material or good that can be used to build roads or settlements, which is the purpose of the game. In this application, each hex is replaced by a flexible display of the same shape, the position and orientation of which is tracked through the hexes such that a board is formed. A computer algorithm then renders the functionality onto each flexible display hex. This is done through a computer algorithm that calculates and randomizes the board design each time, but within and according to the rules of the game. The graphics on the hexes is animated with computer graphics that track and represent the state of the game. All physical objects in the game are tracked by the apparatus of our invention and can potentially be used as display surfaces. For example, when a user rolls a die, the outcome of said roll is known to the game. Alternatively, the system may roll the die for the user, representing the outcome on a cube-shaped flexible display that represents the cast die. In the game, the number provided by said die indicates the hex that is to produce goods for the users. As an example of an animation presented on a hex during this state of the game, when the hex indicates woodland, a lumberjack may be animated to walk onto the hex to cut a tree, thus providing the wood resource to a user. Similarly, city and road objects may be animated with wagons and humans after they are placed onto the hex board elements. Hex elements that represent ports or seas may be animated with ships that move goods from port to port. Animations may trigger behavior in the game, making the game more challenging. For example, a city or port may explode, requiring the user to take action, such as rebuild the city or port. Or a resource may be depleted, which is represented by a woodland hex slowly turning into a meadow hex, and a meadow hex slowly turning into a desert hex that is unproductive. Climate may be simulated, allowing users to play the game under different seasonal circumstances, thus affecting their constraints. For example, during winters, ports may not be in use. This invention allows the functionality of pc-based or online computer games known in the art, such as Simcity, The Sims, World of Warcraft, or Everquest to be merged with that of physical board game elements.

Example 3

3D Flexible Display Objects

In this non-limiting embodiment, the invention is used to provide display on any three dimensional object, such that it allows animation or graphics rendering on said three dimensional object. For example, the invention may be used to implement a rapid prototyping environment for the design of electronic appliance user interfaces, such as, for example, but not limited to, the Apple iPod. One element of such embodiment is a three dimensional model of the appliance, made out of card board, Styrofoam, or the like, and either tracked and projected upon using the apparatus of this invention or coated with electronic paper, LCD, e-ink, OLED or other forms of thin, or thin-film displays, such that the shapes and curvatures of the appliance are followed. Another flexible display apparatus described in this invention. Rather than setting up the board according to the rules of the game, users need just lay out the flexible display surface acts as a palette on which user interface elements such as displays and dials are displayed. These user interface elements can be selected and picked up by the user by tapping its corresponding location on the palette display. Subsequent tapping on the appliance model places the selected user interface element onto the appliance's flexible display surface. User interface elements may be connected or associated with each other using a pen or finger gesture on the surface of the model. For example, a dial user interface element may be connected to a movie user interface element on the model, such that said dial, when activated, causes a scroll through said movie. After organizing elements on the surface, subsequent tapping of the user onto the model may actuate functionality of the appliance, for example, a play button may cause the device to produce sound or play a video on its movie user interface element. This allows designers to easily experiment with various interaction styles and layout of interaction elements such as buttons and menus on the appliance design prior to manufacturing. In another embodiment, the above model is a three-dimensional architectural model that represents some building design. Here, each element of the architectural model consists of a flexible display surface. For example, one flexible display surface may be shaped as a wall element, while another flexible display surface may be shaped as a roof element that are physically placed together to form the larger architectural model. Another flexible display surface acts as a palette on which the user can select colors and materials. These can be pasted onto the flexible display elements of the architectural model using any of the discussed interaction techniques. Once pasted, said elements of the architectural model reflect and simulate materials or colors to be used in construction of the real building. As per Example 2, the flexible display architectural model can be animated such that living or physical conditions such as seasons or wear and tear can be simulated. In another embodiment, the flexible display model represents a product packaging. Here, the palette containing various graphical elements that can be placed on the product packaging, for example, to determine the positioning of typographical elements on the product. By extension of this example, product packaging may itself contain or consist of one or multiple flexible display surfaces, such that the product packaging can be animated or used to reflect some computer functionality, including but not limited to online content, messages, RSS feeds, animations, TV shows, newscasts, games and the like. As a non-limiting example, users may tap the surface of a soft drink or food container with an embedded flexible display surface to play a commercial advertisement or TV show on said container, or to check electronic messages. Users may rotate the container to scroll through content on its display, or use a rub gesture to scroll through content. In another embodiment, the product packaging is itself used as a pointing device, that allows users to control a remote computer system.

Example 4

Flexible Textile Display

In this non-limiting example the flexible display surface consists of electronic textile displays such as but not limited to OLED textile displays known in the art, or white textiles that are tracked and projected upon using the apparatus of this invention. These textile displays may be worn by a human, and may contain interactive elements such as buttons, as per Example 3. In one embodiment of said flexible display fabric, the textile is worn by a human and the display is used by a fashion designer to rapidly prototype the look of various textures, colors or patterns of fabric on the design, in order to select said print for a dress or garment made out of real fabric. In another embodiment, said textures on said flexible textile displays are permanently worn by the user and constitute the garment. Here, said flexible display garment may display messages that are sent to said garment through electronic means by other users, or that represent advertisements and the like.

In another embodiment, the flexible textile display is worn by a patient in a hospital, and displays charts and images showing vital statistics, including but not limited to x-ray, ct-scan, or MRI images of said patient. Doctors may interact with user interface elements displayed on said flexible textile display through any of the interaction techniques of this invention and any technique know in prior art. This includes tapping on buttons or menus displayed on said display to select different vital statistics of said patient. In an operating theatre, the flexible textile display is draped on a patient in surgery to show models or images including but not limited to x-ray, ct-scan, MRI or video images of elements inside the patients body to aid surgeons in, for example, pinhole surgery and minimally invasive operations. Images of various regions in the patient's body may be selected by moving the display to that region.

Example 4

Flexible Human Display

Alternatively, images of vital statistics, x-rays, ct-scans, MRIs, video images and the likes may be projected directly onto a patient to aid or otherwise guide surgery. Here, the human skin itself functions as a display through projection onto said skin, and through tracking the movement and shape of said skin by the apparatus of invention. Such images may contain user interface elements that can be interacted with by a user through techniques of this invention, and those known in the art. For example, tapping a body element may bring up a picture of the most recent x-ray of that element for display, or may be used as a form of input to a computer system.

Example 5

Origami Flexible Display

In this embodiment, several pieces of flexible display are affixed to one another through a cloth, polymer, metal, plastic or other form of flexible hinge such that the shape of the overall display can be folded in a variety of three dimensional shapes, such as those found in origami paper folding. Folding action may lead to changes on the display or trigger computer functionality. Geometric shapes of the overall display may trigger behaviors or computer functionality.

Example 6

Flexible Input Device

In this embodiment, the flexible surface with markers is used as input to a computer system that displays on a standard display that is not said flexible surface, allowing use of said flexible surface and the gestures in this invention as an input device to a computing system.

The contents of all cited patents, patent applications, and publications are incorporated herein by reference in their entirety. While the invention has been described with respect to illustrative embodiments thereof, it will be understood that various changes may be made in the embodiments without departing from the scope of the invention. Accordingly, the described embodiments are to be considered merely exemplary and the invention is not to be limited thereby.

References

1. Balakrishnan, R., G. Fitzmaurice, G. Kurtenbach and Singh, K. Exploring Interactive Curve and Surface Manipulation Using a Bend and Twist Sensitive Input Strip. In *Proceedings of the* 1999 *Symposium on Interactive* 3*D graphics*, ACM Press, 1999, pp. 111-118.
2. Fishkin, K., Gujar, A., Harrison, B., Moran, T. and Want, R. Embodied User Interfaces for Really Direct Manipulation. In *Communications of the ACM*, v. 43 n. 9, 2000, pp. 74-80.
3. Guimbretière, F. Paper Augmented Digital Documents. In *Proceedings of UIST* 2003. Vancouver: ACM Press, 2003, pp. 51-60.
4. Holman, D., Vertegaal, R., Troje, N. PaperWindows: Interaction Techniques for Digital Paper. In Proceedings of ACM CHI 2005 Conference on Human Factors in Computing Systems. Portland, Oreg.: ACM Press, 2005.
5. Ishii, H. and Ullmer, B. Tangible Bits: Towards Seamless Interfaces Between People, Bits and Atoms. In *Proceedings of CHI* 1997. Atlanta: ACM, 1997, pp. 234-241.
6. Johnson, W., Jellinek, H., Klotz, L., Rao, R. and Card S. Bridging the Paper and Electronic Worlds: The Paper User Interface. In *Proceedings of the INTERCHI* 1993. Amsterdam: ACM Press, 1993, pp. 507-512.
7. Ju, W. Bonanni, L., Fletcher, R., et al. Origami Desk: Integrating Technological Innovation and Human-centric Design. In *Proceedings of DIS* 2002. London: ACM Press, 2002, pp. 399-405.
8. Klemmer, S., Newman, M., Farrell, R., Bilezikjian, M. and Landay, J. The Designers' Outpost: A Tangible Interface for Collaborative Web Site Design. In *Proc. of UIST* 2001. Orlando: ACM Press, 2001, pp. 1-10.
9. Lange, B., Jones, M., and Meyers, J. Insight Lab: An Immersive Team Environment Linking Paper Displays and Data. In *Proceedings of CHI* 1998. Los Angeles: ACM Press, 1998, pp. 550-557.
10. Levine, S. R. and S. F. Ehrlich. The Freestyle System: A Design Perspective. In *Human-Machine Interactive Systems*, A. Klinger, Editor, 1991, pp. 3-21.
11. Mackay, W. E. & Fayard, A-L. Designing Interactive Paper: Lessons from Three Augmented Reality Projects. In *Proceedings of IWAR '98, International Workshop on Augmented Reality*. Natick, MA: A K Peters, Ltd., 1998.
12. Moran, T., Saund, E., Van Melle, W., Gujar, A., Fishkin, K. and Harrison, B. Design and Technology for Collaborage: Collaborative Collages of Information on Physical Walls. In *Proceedings of UIST* 1999. Asheville, N.C: ACM Press, 1999, pp. 197-206.

13. O'Hara, K. and Sellen, A. A Comparison of Reading Paper and On-line Documents. In *Proceedings of CHI* 1997. Atlanta: ACM Press, 1997, pp. 335-342.
14. Philips OLED Technology. http://www.business-sites.philips.com/mds/section-1131/
15. Piper, B., Ratti, C. and H. Ishii. Illuminating Clay: A 3-D Tangible Interface for Landscape Analysis In Proceedings of CHI 2002. Minneapolis: ACM Press, 2002.
16. Rekimoto, J. Pick-and-Drop: A Direct Manipulation Technique for Multiple Computer Environments. In *Proceedings of UIST* 1997. Banff: ACM Press, 1997, pp. 31-39.
17. Rekimoto, J. Ullmer, B. and H. Oba, DataTiles: A Modular Platform for Mixed Physical and Graphical Interactions. In *Proceedings of CHI* 2001. Seattle: ACM Press, 2001
18. Rekimoto, J. SmartSkin: An Infrastructure for Freehand Manipulation on Interactive Surfaces. In *Proceedings of CHI* 2002. Minneapolis: ACM Press, 2002, pp. 113-120.
19. Schilit, B., Golovchinsky, G., and Price, M. Beyond Paper: Supporting Active Reading with Free Form Digital Ink Annotations. In *Proceedings of CHI* 1998. Los Angeles: ACM Press, 1998, pp. 249-256.
20. Schwesig, C., Poupyrev, I., and Mori, E. Gummi: A Bendable Computer. In *Proceedings of CHI* 2004. Vienna: ACM Press, 2003, pp. 263-270.
21. Sellen, A., and Harper, R. The Myth of the Paperless Office, MIT Press, Cambridge, Mass., 2003.
22. Sun Starfire: A Video of Future Computing. http://www.asktog.com/starfire/starfirescript.html.
23. Vicon. http://www.vicon.com
24. Weiser, M. The Computer for the 21st Century. Scientific American, 1991, 265 (3), pp. 94-104.
25. Wellner, P. The DigitalDesk Calculator: Tangible Manipulation on a Desk Top Display. In *Proceedings of UIST* 1991. Hilton Head: ACM Press, 1991, pp. 27-33.

What is claimed is:

1. A method for providing input to a computer system that uses at least one property selected from shape, orientation, and location of a flexible display surface associated with the computer system, or a change in one or more said properties; wherein the input is selected from the group consisting of:
    a) Hold, wherein the flexible display is activated as a destination of computer commands, or activates associated computing commands, comprising holding the display with one or two hands, and wherein the display remains the active display until another such display is activated;
    b) Flip or Turn, wherein rotating the flexible display around its horizontal axis or vertical axis wherein one edge of the display is lifted up and then folded over, is used as input to the computer system;
    c) Fold, wherein folding the flexible display about one of its axes is used as input to the computer system;
    d) Part-fold, wherein partly folding the flexible display is used as input to the computer system;
    e) Semi-permanent fold, wherein folding the flexible display about one of its axes such that it remains in a folded state after release is used as input to the computing system;
    f) Roll, wherein changing the shape of the flexible display such that the shape transitions from planar to cylindrical or vice versa is used as input to the computing system;
    g) Rub, a rubbing gesture wherein a hand or finger or a tool moved back and forth over the flexible display is used as input to the computing system;
    h) Staple, wherein using an impact of the flexible display with a second flexible display is used as input to the computing system; and
    i) Pointing, wherein the location of a hand, finger, or tool relative to the flexible display is used as input to the computer system.

2. The method of claim 1, wherein input (g) is applied to a first flexible display collated with a second display, and wherein input (g) causes content of the first flexible display to be copied or otherwise moved onto the second display.

3. The method of claim 2, wherein the second display is a flexible, traditional, or rigid computer display terminal;
    wherein content is moved from the second display to the first flexible display if the first flexible surface does not display an image; or
    wherein content is moved from the first flexible display to the second display when the first flexible display does display an image.

4. The method of claim 2, wherein the second display is associated with a computing peripheral that has a processing action, and wherein content is moved from the first flexible display to the computing peripheral for processing.

5. The method of claim 4, wherein the computing peripheral is a printer or network peripheral, and wherein content is moved to the printer or network peripheral, or to a remote location for printing or viewing on a computing system.

6. The method of claim 1, wherein the input to the computer system causes a command to be executed on the computer system and wherein the command is selected from:
    a) Activate, wherein a file or computer content, image, selection, or window associated with or displayed on the flexible display is selected;
    b) Zoom in, wherein an image or content of a file associated with the flexible display is enlarged;
    c) Zoom out, wherein an image associated with the flexible display is reduced;
    d) Organize, wherein a file, digital information, text, image, or other computer content associated with or displayed on the flexible display is organized or sorted digitally such that it matches organization or sorting on the flexible display;
    e) Scroll, wherein an image or content of a file associated with the flexible display is scrolled, such that a portion of the image or content of the file is revealed that was previously not rendered, or that is contiguous to what is currently rendered on the flexible surface, or other display;
    f) Page Down, wherein a section of the content of a file that is subsequent to the section of the content that is currently displayed on or associated with the flexible display, or other display, causes the subsequent section to render on the flexible display or other display;
    g) Page Up, wherein a section of the content of a file that precedes the section of the content that is currently displayed on or associated with the flexible display, or other display, causes the subsequent section to render on the flexible display or other display;
    h) Navigate, wherein navigation toward an arbitrary section of the content of a file associated with the flexible display, or an online content or hyperlink associated with the display, causes the content to render on the flexible display or other display;
    i) Page Back or Page Forward, wherein navigation toward a section of the content of a file, or online content, webpage, or hyperlink that precedes or follows the content currently displayed or associated with the flexible display, causes the content to render on the flexible display or other display;
j) Open or Close, wherein a file or digital information associated with the flexible display is opened or closed, read into memory, or output to a permanent medium;
k) Sleep or Wake, wherein the flexible display is de-activated or activated from a state of reduced energy use;
l) Deformation, wherein shape of a three dimensional model associated with the flexible display is deformed such that it follows the deformation of the flexible display, in any dimension;
m) Save, wherein a file associated with the flexible display is saved to a hard drive or other permanent medium or online service;
n) Move or Copy, wherein a file or other digital information, or some portion or selection thereof, currently associated with the flexible display is transferred to another flexible display or computing device;
o) Duplicate, wherein information or a file associated with the flexible display is made identical to that of a second flexible display so as to clone or duplicate the information on the second flexible display;
p) Select, wherein items or images, or both, displayed on the flexible display are selected;
q) Stationary, wherein the flexible display or other display shows a set of icons indicating a set of computing applications, or potential functionality of the flexible display, and wherein the computer system refrains to the application functionality after selecting the icon of the application;
r) Focus and Context, wherein a second flexible display stacked beneath the flexible display displays a summary, menu, or set of thumbnails pertaining to content of the flexible display; and
s) Enlarge, wherein collocation of multiple flexible displays enlarges content across all collocated flexible displays.

7. The method of claim 1, comprising using an accelerometer embedded in or fixed to the flexible display to sense one or more of shape, orientation, and location of the flexible display, or to sense a change in one or more of shape, orientation, and location of the flexible display, and provide input to the computer system.

8. The method of claim 1, comprising detecting intensity of light passing through one or more optical fiber embedded in or fixed to the flexible display to sense shape of the flexible display, or to sense a change in shape of the flexible display, and provide input to the computer system.

9. The method of claim 1, wherein opening a hyperlink causes an online connection to be made by the computer system.

10. The method of claim 1, wherein the input is applied to a stack or pile of flexible displays.

11. The method of claim 1, comprising providing input to a computer system that uses at least one property selected from shape, orientation, and location of two or more flexible display surfaces associated with the computer system, or a change in one or more said properties, wherein the input is selected from the group consisting of:
a) Collocate, wherein collocating multiple flexible displays to create a larger flexible display is used as input to the computer system;
b) Collate, wherein stacking multiple flexible displays on top of one another is used as input to the computer system; and
c) Pile, wherein physical organization of a pile of flexible displays is used as input to the computing system.

12. The method of claim 1, comprising providing input to a computer system that uses at least one property selected from shape, orientation, and location of one or more flexible display surfaces associated with the computer system, or a change in one or more said properties, wherein the input comprises:
Bend, wherein bending the flexible display about one of its axes is used as input to the computing system;
wherein the input to the computer system causes a command to be executed on the computer system;
wherein the command is selected from:
a) Activate, wherein a file or computer content, image, selection, or window associated with or displayed on the flexible display is selected;
b) Zoom in, wherein an image or content of a file associated with the flexible display is enlarged;
c) Zoom out, wherein an image associated with the flexible display is reduced;
d) Organize, wherein a file, digital information, text, image, or other computer content associated with or displayed on the flexible display is organized or sorted digitally such that it matches organization or sorting on the flexible display;
e) Scroll, wherein an image or content of a file associated with the flexible display is scrolled, such that a portion of the image or content of the file is revealed that was previously not rendered, or that is contiguous to what is currently rendered on the flexible surface, or other display;
f) Navigate, wherein navigation toward an arbitrary section of the content of a file associated with the flexible display, or an online content or hyperlink associated with the display, causes the content to render on the flexible display or other display;
g) Open or Close, wherein a file or digital information associated with the flexible display is opened or closed, read into memory, or output to a permanent medium;
h) Sleep or Wake, wherein the flexible display is de-activated or activated from a state of reduced energy use;
i) Deformation, wherein shape of a three dimensional model associated with the flexible display is deformed such that it follows the deformation of the flexible display, in any dimension;
j) Save, wherein a file associated with the flexible display is saved to a hard drive or other permanent medium or online service;
k) Move or Copy, wherein a file or other digital information, or a portion or selection thereof, currently associated with the flexible display is transferred to another flexible display or computing device;
l) Duplicate, wherein information or a file associated with the flexible display is made identical to that of a second flexible display so as to clone or duplicate the information on the second flexible display;
m) Select, wherein items or images, or both, displayed on the flexible display are selected;
n) Stationary, wherein the flexible display shows a set of icons indicating a set of computing applications, or potential functionality of the flexible display, and wherein the computer system refrains to the application functionality after selecting the icon of the application;
o) Focus and Context, wherein a second flexible display stacked beneath the flexible display displays a summary, menu, or set of thumbnails pertaining to content of the flexible display; and
p) Enlarge, wherein collocation of multiple flexible displays enlarges content across all collocated flexible displays.

* * * * *